United States Patent [19]

Drusiani

[11] Patent Number: 5,099,637
[45] Date of Patent: Mar. 31, 1992

[54] TOOL FOR OLIVE-PICKING

[75] Inventor: Franco Drusiani, Savena, Italy
[73] Assignee: M.A.I.BO S.R.L., Bologna, Italy
[21] Appl. No.: 605,732
[22] Filed: Oct. 30, 1990

[30] Foreign Application Priority Data

Jun. 4, 1990 [IT] Italy ............................. 4838/90[U]

[51] Int. Cl.$^5$ .............................................. A01D 46/00
[52] U.S. Cl. ........................................ 56/332; 56/330
[58] Field of Search ................... 56/332, 333, 334, 340, 56/330

[56] References Cited

U.S. PATENT DOCUMENTS

| 406,744 | 7/1889 | Kriner | 56/332 |
|---|---|---|---|
| 422,373 | 3/1890 | Caldwell | 56/332 |
| 515,702 | 2/1894 | Abbott | 56/332 |
| 691,595 | 1/1902 | Carter | 56/333 |
| 3,522,697 | 8/1970 | Shaff | 56/330 |
| 3,534,536 | 10/1970 | Soler-Espiauba | 56/332 |

FOREIGN PATENT DOCUMENTS 724798 12/1932 France ......................... 56/333

Primary Examiner—Stephen J. Novosad
Attorney, Agent, or Firm—Darby & Darby

[57] ABSTRACT

A tool for olive-picking, includes a rod bearing, at one of its ends, a handle with which a lever is associated, for controlling a pneumatic actuator located at an opposite end of the rod. The actuator swings a comb provided with tines, each of them being made up of two sections having a thicker and a thinner diameter respectively. Each tine is coated with a sheath of elastic and yielding material, which prevents olives from being damaged during the picking, that is carried out by inserting the comb among the branches first, and then by the subsequent swinging, controlled by the actuator.

4 Claims, 2 Drawing Sheets

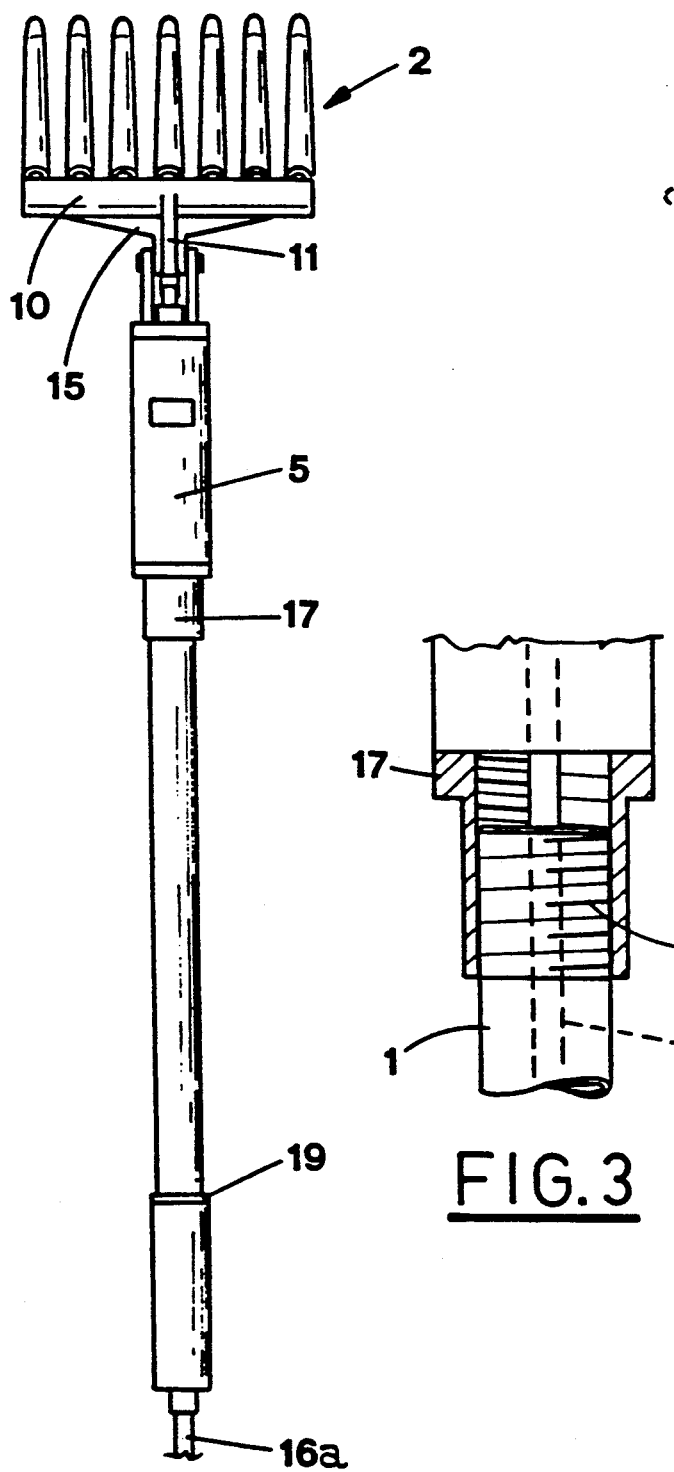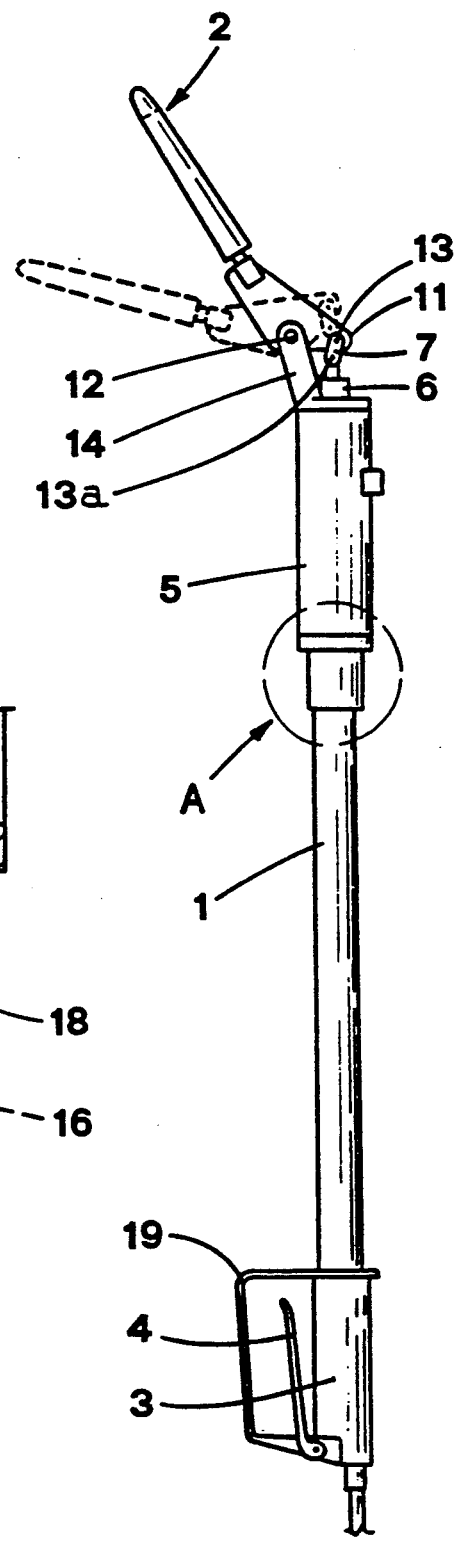

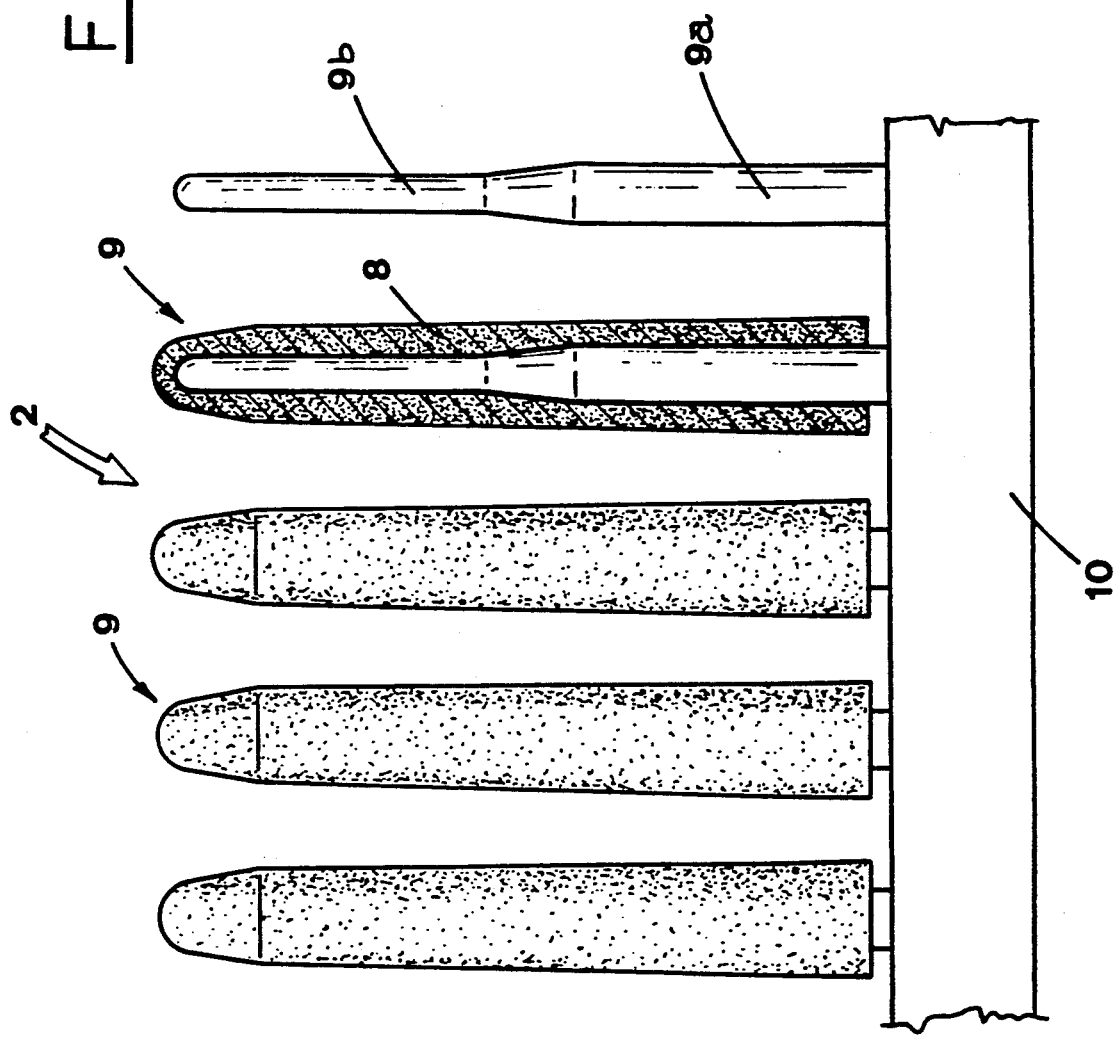

TOOL FOR OLIVE-PICKING

BACKGROUND OF THE INVENTION

The invention concerns a tool for mechanized olive-picking.

DESCRIPTION OF THE PRIOR ART

It is known that olive-picking involves the use of tools comprising a rod having, articulated to one of its ends, a sort of comb suited to be inserted among the tree branches.

The comb is made to swing by the action of a pneumatic actuator, born by said rod, so to cause, by such movement, the olives to come off the branches.

It is also known that the comb is made up of a certain number of tines having two sections of different diameter connected with each other.

The olive-picking tools used nowadays have the tines made of stiff plastic material; in this way, however, the olives are frequently bruised; this drawback is not acceptable in the case that the olives are destined to table consumption (as hors-d'oeuvre, etc.) rather than to oil-making.

SUMMARY OF THE INVENTION

The object of the invention is to solve the above-mentioned problem, by means of a tool which makes it possible to carry out olive-picking easily and effectively.

A further object of the invention is to provide a tool for olive-picking made through a technical solution and that turns out to be simple, really functional and reliable, as well as of versatile use.

The above-mentioned objects are achieved by means of a tool for olive-picking that includes a rod having, at one of its ends, a handle, with a pneumatic actuator fastened to the end of the rod opposite in respect of the handle.

A comb is fastened to the end of the rod opposite to the handle, and is able to swing in respect of the rod.

The comb is connected to the actuator by means of a shaft, while the actuator is operated by means of a lever, hinged to the handle, in order to make the comb to swing.

A series of tines are fastened to the body and coated with sheaths of yielding elastic material to avoid damaging the olives in the phase of insertion and subsequent swinging of the comb among the olive-tree branches.

BRIEF DESCRIPTION OF THE DRAWINGS

The features of the invention shall be pointed out by the description of a preferred embodiment of the olive-picking tool, illustrated by the enclosed drawings, where:

FIG. 1 shows a side view of the olive-picking tool;

FIG. 2 shows a plan view of the same tool;

FIG. 3 shows an enlarged sectional view of the detail A of FIG. 1.

FIG. 4 shows an enlarged plan view of a part of the comb, with a sectioned tine.

DESCRIPTION OF THE PREFERRED EMBODIMENT

With reference to said figures, and particularly to the FIGS. 1, 2 and 3, no.1 indicates a rod provided, at its ends, with respective threaded heads 18,19 with which a sleeve 17 and a handle 3 are correspondingly coupled.

Coaxially integral with the sleeve 17, there is a pneumatic actuator 5 powered through a tube 16, inside the rod 1 (as shown in the sectional view of the rod-actuator coupling in FIG. 3).

In series with said rod there is coupled, corresponding with a threaded hole (not shown) provided in the lower end of the handle, a tube 16A, external to the rod, associated with a source of compressed air.

Said actuator 5 is controlled, in a known way, by acting on a lever 4 articulated to said handle 3. With the actuator 5, on the opposite side relative to the rod, a comb 2 is connected, which is swung by the same actuator through a known linkage; consisting basically of a shaft 6, located coaxially with the actuator 5 and caused by it to reciprocate, to which a small arm 7 is pivoted, provided with two pivots seatings 13A and 13, the former being coupled with said shaft 6 and the latter with an element 11 integral with a body 10, being a part of the comb, placed transverse to the rod in the assembling phase, with said body provided with ribs 15 for stiffening the element 11.

Furthermore, said body 10 is articulated to a fork 14, extending above the actuator 5, by means of a pivot 12 (all this is particularly visible in FIG. 1).

From the body 10, on the opposite side relative to the element 11, a certain number of tines 9 are branching off, parallel to each other; FIG. 4 shows, in enlarged scale, a part of the comb 2 in its main parts.

From said figure it may be noticed that each of the tines 9 presents a section of thicker diameter 9A adjacent to the coupling with the body 10 and, properly fastened thereto, a section of thinner diameter 9B.

The lengths of said sections 9A and 9B are, e.g., equal, with the terminal part of the section 9B rounded. Said tines 9 are equidistant from each other; the number of tines and the mutual distance are varying according to the specific working requirements.

An advantage offered by the special structure of said tool is the possibility of changing the comb with extreme facility; as a matter of fact, since the body 10 of the comb 2 is coupled with the remaining part of the tool by means of two pivots 12 and 13, it is sufficient to act on said pivots to fit the comb 2 of the desired size in a very simple way.

Said tines 9 are all of the same length and coated with a sheath 8 of yielding elastic material (e.g. India rubber) which allows, when the comb 2 is inserted among the olive-tree branches, to avoid damaging the olives, as it usually happens with the conventional tines of stiff material.

A further advantage offered by the presence of said sheaths 8, is that these allow to protect the tines 9, which otherwise would be subject to wearing, with the consequent need of replacing the whole comb, as it happens quite frequently with the known tool.

With the present tool, on the contrary, it is sufficient to replace, when necessary, only the sheaths 8 which cannot be used any longer, and not necessarily all at the same time (as it is the case with the known tools, for which the replacement of the whole comb 2 is required, even though just a few tines turn out to be worn out).

The positioning of the actuator 5 near the comb 2 offers the advantage of minimizing the length of the shaft 6, which in this way may be controlled better in its stroke, exterior to the actuator 5, than it would be if the latter were positioned near the handle 3.

A further advantage offered by the preferred positioning of the actuator 5 is the possibility of varying the length of the rod 1 without having to change the length of the shaft 6, thus completely eliminating the drawbacks brought about by the problems connected with the size of the actuator-shaft unit.

As a matter of fact, if a disproportion occurred between the shaft size and the actuator size, the latter would find it difficult to swing the shaft correctly, owing to the size of the same shaft; on the contrary, with the tool presented hereby it is sufficient to adjust the length of the tube 16 according to the rod 1.

Such operation may be carried out easily (both at the moment of purchase and subsequently) thanks to the two threaded heads 18 and 19, respectively engaging with the actuator 5 (through the sleeve 17 integral with it) and the handle 3.

From all what has been said above, the functional capacity of this tool made up of interchangeable parts (rod, pneumatic actuator, comb) becomes evident; the highest reliability of operation is also assured.

The operation of the tool described may be easily understood. The comb 2 is inserted among the tree branches and controlled by the pneumatic actuator 5, so to cause, by a swinging movement, the olives to come off the branches.

It is understood that the above has been described by way of example and not as a limitation, therefore any variations of the construction details, of practical-applicable nature, (e.g. rod size, comb size, relative number of tines, etc.) are understood as covered by the technical solution described above and claimed here below.

What is claimed is:

1. A tool for olive picking, comprising:
   a rod of extended length, said rod having a first end and s second end;
   a comb rotatably connected proximate said first end for pivoting relative to said rod, said comb including a plurality of tines;
   an actuator fastened to said rod at said first end, said actuator including moving means for connecting to said comb and causing said comb to pivot when said actuator is operated;
   a handle connected to said rod proximate said second end;
   control means connected to said handle and operable by a user to activate said actuator, whereby said comb is pivoted;
   a plurality of yielding elastic sheaths, each of said tines being coated with a respective sheath.

2. A tool as in claim 1, wherein each of said tines has a fixed end and a free end, and further comprising a body connected to said fixed ends, each of said sheaths coating a respective free end of one of said tines and extending towards said fixed end.

3. A tool as in claim 2, wherein said tines are generally parallel to each other and equi-spaced from each other, each of said tines including two contiguous sections of different diameters, the section of larger diameter being at said fixed end and the section of smaller diameter being at said free end, said free end being rounded.

4. A tool as in claim 2, wherein said sheaths are separate from one another.

* * * * *